US012486689B2

(12) United States Patent
Johnston et al.

(10) Patent No.: US 12,486,689 B2
(45) Date of Patent: Dec. 2, 2025

(54) ELEVATED TANK TOWER

(71) Applicant: Pittsburg Tank & Tower Group, Henderson, KY (US)

(72) Inventors: Benjamin Johnston, Henderson, KY (US); Martin G. Smith, Henderson, KY (US)

(73) Assignee: PITTSBURG TANK & TOWER GROUP, Henderson, KY (US)

( * ) Notice: Subject to any disclaimer, the term of this patent is extended or adjusted under 35 U.S.C. 154(b) by 232 days.

(21) Appl. No.: 18/151,139

(22) Filed: Jan. 6, 2023

(65) Prior Publication Data

US 2023/0220698 A1 Jul. 13, 2023

Related U.S. Application Data

(60) Provisional application No. 63/297,487, filed on Jan. 7, 2022.

(51) Int. Cl.
| | | |
|---|---|---|
| *E04H 12/30* | (2006.01) | |
| *E03B 11/12* | (2006.01) | |
| *E04H 12/12* | (2006.01) | |
| *E04H 12/34* | (2006.01) | |

(52) U.S. Cl.
CPC .............. *E04H 12/30* (2013.01); *E03B 11/12* (2013.01); *E04H 12/12* (2013.01); *E04H 12/342* (2013.01)

(58) Field of Classification Search
CPC ....... E04H 12/30; E04H 12/342; E03B 11/12; E04B 12/12
See application file for complete search history.

(56) References Cited

U.S. PATENT DOCUMENTS

| | | | |
|---|---|---|---|
| 1,947,515 A | | 2/1934 | Blackburn |
| 3,363,795 A | * | 1/1968 | Stuart, III ............... E03B 11/12 220/567 |
| 4,068,482 A | | 1/1978 | Hilfiker |
| (Continued) | | | |

FOREIGN PATENT DOCUMENTS

| | | |
|---|---|---|
| CS | 228187 B1 | 5/1984 |
| FR | 2038453 A5 | 1/1971 |
| (Continued) | | |

OTHER PUBLICATIONS

United States Patent and Trademark Office, International Search Report and Written Opinion issued in corresponding Application No. PCT/US2023/060221, mailed Apr. 14, 2023.

(Continued)

*Primary Examiner* — Andrew J Triggs
(74) *Attorney, Agent, or Firm* — Stites & Harbison, PLLC; Terry L. Wright; James R. Hayne

(57) ABSTRACT

An elevated tank tower includes a foundation, and a support structure including a plurality of stacked segments. One or more of the plurality segment is unitarily constructed from precast concrete configured to extend around the entirety of an outer perimeter of the support structure. Each of the stacked segments is connected to an adjacent segment with one or more spanning plates connected to the adjacent segments. A superstructure is positioned atop of the support structure and operably connected to an uppermost segment of the plurality of segments. A containment tank is positioned atop the superstructure.

9 Claims, 17 Drawing Sheets

(56) References Cited

U.S. PATENT DOCUMENTS

| | | | |
|---|---|---|---|
| 4,660,336 A | 4/1987 | Cazaly et al. | |
| 5,029,426 A | 7/1991 | Larson et al. | |
| 5,131,201 A | 7/1992 | Larson et al. | |
| 5,491,948 A | 2/1996 | Harris | |
| 6,318,034 B1 * | 11/2001 | Zavitz | E03B 11/12 |
| | | | 52/194 |
| 6,739,469 B1 | 5/2004 | Kim | |
| 7,739,843 B2 | 6/2010 | Cortina-Cordero | |
| 7,770,343 B2 | 8/2010 | Montaner Fraguet et al. | |
| 8,261,510 B2 | 9/2012 | Johnson et al. | |
| 8,505,244 B2 | 8/2013 | Gomez et al. | |
| 8,555,600 B2 | 10/2013 | Cortina-Cordero et al. | |
| 8,720,161 B2 | 5/2014 | Herrius de Roest | |
| 8,734,705 B2 | 5/2014 | Knox et al. | |
| 8,950,149 B2 | 2/2015 | Stahl | |
| 9,169,831 B2 | 10/2015 | Arlaban Gabeiras et al. | |
| 9,187,921 B1 * | 11/2015 | Neighbors | E04H 7/02 |
| 9,441,389 B2 | 9/2016 | Shiomi et al. | |
| 10,138,648 B2 * | 11/2018 | Zavitz | E04H 12/16 |
| 10,435,913 B2 | 10/2019 | Zavitz | |
| 10,676,889 B2 | 6/2020 | Corella et al. | |
| 11,168,457 B2 | 11/2021 | Betz et al. | |
| 11,332,952 B2 * | 5/2022 | Porm | E04H 12/342 |
| 11,629,698 B2 * | 4/2023 | Garcia De La Pena Razquin | B66C 23/185 |
| | | | 212/175 |
| 2011/0146181 A1 | 6/2011 | Traulsen et al. | |
| 2015/0252580 A1 | 9/2015 | Hangel | |
| 2016/0348391 A1 | 12/2016 | Zavitz et al. | |
| 2022/0298820 A1 * | 9/2022 | Madsen | E04H 12/16 |
| 2023/0220698 A1 * | 7/2023 | Johnston | E04H 7/06 |
| | | | 52/292 |

FOREIGN PATENT DOCUMENTS

| | | |
|---|---|---|
| GB | 1287156 A | 8/1972 |
| SU | 554390 A1 | 4/1977 |
| WO | 2013098086 A1 | 7/2013 |
| WO | 2019002096 A1 | 1/2019 |
| WO | 2020239587 A1 | 12/2020 |

OTHER PUBLICATIONS

DN Tanks, Our Tanks, 2016, dntanks.com.

NPCA, Precast Concrete Towers Over the Competition, 2014, precast.org.

* cited by examiner

ELEVATED TANK TOWER

RELATED APPLICATIONS

This application claims priority from U.S. Provisional Application Ser. No. 63/297,487, filed Jan. 7, 2022, the entire disclosure of which is incorporated herein by this reference.

TECHNICAL FIELD

The present invention relates to elevated tank towers. In particular, certain embodiments of the present invention relate to elevated tank towers with a support structure, or shaft, made of a plurality of precast segments that are stacked to form the shaft.

BACKGROUND

Historically, elevated storage tanks have been constructed either entirely of steel or with a steel storage tank supported by a reinforced concrete pedestal or shaft. Concrete pedestals or shafts are especially good at supporting the vertical load of the filled storage tank. However, they also require larger diameter supports as compared to steel in order to resist lateral forces. Typically, concrete pedestals or shafts are constructed through concrete poured on site which requires a continuous, uninterrupted supply of concrete once a pour has been committed and started. Any delays in delivery of concrete to the jobsite or placement into the forms may lead to cold joints and/or voids or other defects within the pour. Severe weather (such as heavy rain and/or high winds) which render continued onsite activities impractical or unsafe can also result in problems. Temperature extremes, either hot or cold, can have a deleterious effect on the structural and aesthetic qualities of the concrete. Mechanical breakdowns of pumping or placing equipment can cause delays in pouring the concrete into the formwork at higher elevations. Site cast concrete construction also generally requires a site location that is accessible by concrete trucks from a local ready mix concrete plant.

Precast concrete panels have, in some instances, been used to construct the pedestals or shaft for elevated storage tanks, but due to the typically large diameters required of concrete pedestals, these panels only extend around a portion of the perimeter of the pedestal or shaft. Not only does this require multiple precast pieces to complete each level of the pedestal, increasing the overall cost, but it significantly increases the complexity of construction due to the additional connections required. Furthermore, each connection point presents a likely failure point once the elevated storage tank is completed and under load. Accordingly, an elevated storage tank constructed with concrete that is faster, cheaper, safer, and easier to construct would be both highly desirable and beneficial.

SUMMARY

The present invention includes elevated tank towers. In particular, certain embodiments of the present invention are directed to elevated tank towers with a support structure made of a plurality of precast segments that are stacked to form a shaft. Each segment is a ring so as to extend around the entirety of the shaft.

According to some exemplary embodiments, an elevated tank tower includes a foundation and a support structure including a plurality of stacked segments. Each of the stacked segments is connected to an adjacent segment with one or more spanning plates connected to the adjacent segments. One or more of the plurality of segments is unitarily constructed from precast concrete and configured to extend around the entirety of an outer perimeter of the support structure.

According to some exemplary embodiments, each of the plurality of segments has the same diameter such that the support structure is substantially cylindrical.

According to some exemplary embodiments, a lowermost segment is connected to the foundation with one or more angle plates bolted to the lowermost segment and the foundation.

According to some other exemplary embodiments, a lowermost segment is connected to the foundation with one or more mounting plates embedded in the lowermost segment and one or more anchor chairs each welded to one of the one or more mounting plates, each of the one or more anchor chairs bolted to the foundation.

According to some exemplary embodiments, the plurality of segments includes the lowermost segment, an uppermost segment, and one or more intermediate segments extending between the lowermost segment and the uppermost segment, where each of the intermediate segments is identical.

According to some exemplary embodiments, the spanning plates are connected to the stacked segments with bolt anchors installed after the segment is stacked on top of the adjacent segment.

According to some other exemplary embodiments, the spanning plates are connected to the stacked segments by welding the spanning plate to a mounting plate installed when the segments are cast from concrete.

According to some exemplary embodiments, vertical tie-rods are further included which connect at least two adjacent segments of the support structure.

According to some exemplary embodiments, horizontal members span across an internal space of the support structure and connect different points of an internal surface of the support structure.

According to some exemplary embodiments, a superstructure is positioned atop of the support structure and operably connected to an uppermost segment of the plurality of segments.

According to some exemplary embodiments, a containment tank is positioned atop the superstructure, where the tank has a capacity of about 60,000 gallons to about 300,000 gallons.

According to some exemplary embodiments, each of the plurality of segments has the same diameter such that the support structure is substantially cylindrical. In some embodiments, the diameter of each of the plurality of segments is about 12 feet to about 16 feet, and a height of each segment is between about 6 feet and about 8 feet.

According to some exemplary embodiments, the containment tank is a welded carbon tank, a stainless steel tank, a bolted galvanized tank, or a glass fused tank.

According to some exemplary embodiments, the containment tank has a capacity of about 60,000 gallons to about 300,000 gallons.

According to some exemplary embodiments, the plurality of segments has the same diameter such that the support structure is substantially cylindrical.

According to some exemplary implementations of the present invention, a method of manufacturing an elevated tank tower includes the steps of: pouring a concrete foundation; casting a plurality of substantially identical ring segments; stacking a lowermost segment on the foundation and connecting the lowermost segment to the foundation; sequentially stacking one or more intermediate segments on the lowermost segment and connecting each intermediate segment to an adjacent segment until an uppermost segment is stacked to thereby form a substantially cylindrical support structure; providing a superstructure which is operably connected to the uppermost segment; and providing a containment tank which is connected to an upper surface of the superstructure.

According to some exemplary implementations, the segments are connected to the adjacent segment with spanning plates bolted to the segments after the segment is stacked.

According to some exemplary implementations, the segments are connected to the adjacent segment with spanning plates welded to mounting plates installed in the segments when the segments are cast.

According to some exemplary implementations, before stacking each segment, horizontal members are installed across an internal space of the segment, the horizontal members connecting different points of an internal surface of segment.

DESCRIPTION OF EXEMPLARY EMBODIMENTS

The present invention includes elevated tank towers. In particular, certain embodiments of the present invention are directed to elevated tank towers with a support structure, also known as a pedestal or shaft (hereinafter referred to as a shaft), made of a plurality of precast segments that are stacked to form the shaft. Each segment is a ring so as to extend around the entirety of the shaft.

Figure 1:
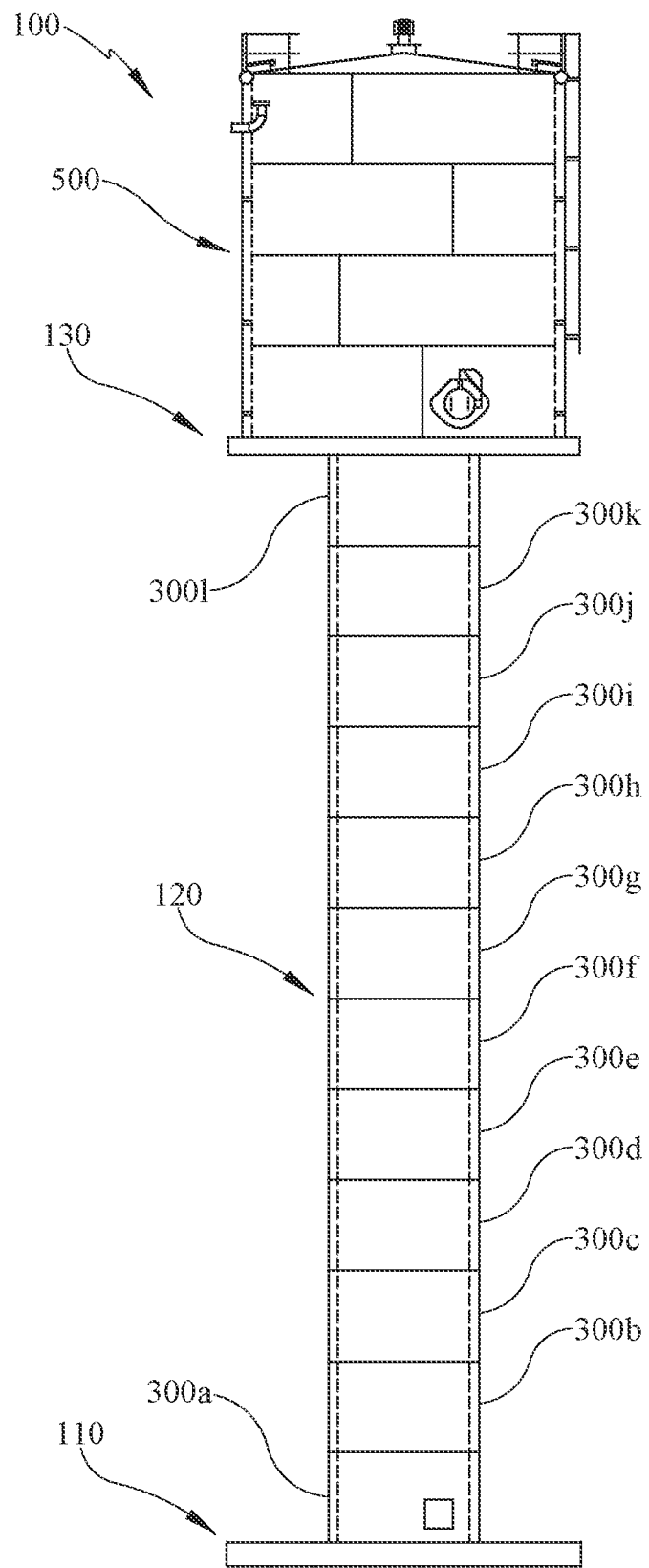
FIG. 1 is a side view of an elevated tank tower made in accordance with one embodiment of the present invention, and in which a steel tank is included.

Referring first to FIG. 1, in one exemplary embodiment of the present invention, an elevated tank tower 100 is provided that comprises a foundation 110, a support structure (i.e., a shaft 120), a support superstructure (i.e., a superstructure 130), and a containment tank (i.e., a welded steel tank 500). The shaft 120 includes a plurality of stacked segments 300a-300l and is operably connected to the foundation 110, as discussed further below. The superstructure 130 is positioned atop and operably connected to the shaft 120, as also discussed further below. In the embodiment shown in FIG. 1, there are twelve segments 300a-300l, including a lowermost segment 300a, an uppermost segment 300l, and a plurality of intermediate segments 300b-300k extending between the lowermost segment 300a and the uppermost segment 300l, which form the shaft 120. Other numbers of segments are, of course, also possible without departing from the spirit and scope of the present invention.

With respect to the foundation 110, according to some embodiments, the foundation 110 is first constructed using piling, aggregate piles, auger cast piers, post tensioned slabs, prestressed precast slabs, or concrete spread footings and walls to pour the foundation 110 in place. Of course, these are merely exemplary and other foundation types could be utilized which are customary to the industry. The foundation type is dictated by the local geotechnical analysis and is site specific.

With respect to the stacked segments in particular, each segment 300a-300l is unitarily constructed from precast concrete and forms a ring. As used herein, the term "ring" is not limited to any particular shape. Rather, the ring shape of each segment 300a-300l refers to the fact that the segment 300*a*-300*l* extends around the entirety of the shaft 120 without any separations or breaks. In the embodiment shown in FIG. 1, the segments 300*a*-300*l* are circular rings but it is contemplated that in other embodiments the segments can be any number of different shapes including, for example, an oval, rectangle, square, pentagon, hexagon, etc.

According to some exemplary embodiments, each of the segments 300*a*-300*l* is substantially identical. Specifically, as the segments 300*a*-300*l* are unitarily constructed from precast concrete, it is contemplated that each of the segments 300*a*-300*l* can be made with one or more identical precasting molds, thereby reducing the equipment necessary for constructing the elevated tower tank of the present invention. The exemplary ring segments 300*a*-300*l* therefore each have the same diameter such that the shaft 120 is substantially cylindrical. Each of the segments 300*a*-300*l*, and therefore the shaft 120, has a diameter of about 12 feet to about 16 feet. Each of the segments 300*a*-300*l* also has a height of about 6 feet to about 8 feet such that the exemplary shaft 120 including twelve segments 300*a*-300*l* has a height of about 72-96 feet. Of course, other diameters and heights of individual segments chosen to achieve the resulting shaft are possible and may be chosen to achieve a required total height of the shaft.

Although not expressly shown, segments made in accordance with the present invention can, in some embodiments, include reinforcing steel (e.g., rebar and/or mesh) which is placed within the precast mold in one or more layers as design dictates prior to pouring and curing the concrete, as would be readily understood by a person of ordinary skill in the art. While in some embodiments the reinforcing steel is the same between all of the segments, in other embodiments, the amount of reinforcing steel varies between the segments. As will be discussed in further detail below, other elements can likewise be embedded within one or more of the segments prior to pouring the concrete, after pouring but before the concrete fully cures, or after the concrete has cured.

With respect to the superstructure 130, according to some embodiments, the superstructure 130 is made of beams (carbon, galvanized, or stainless steel) and/or concrete (precast, cast in place, or post tensioned concrete).

Figure 2:
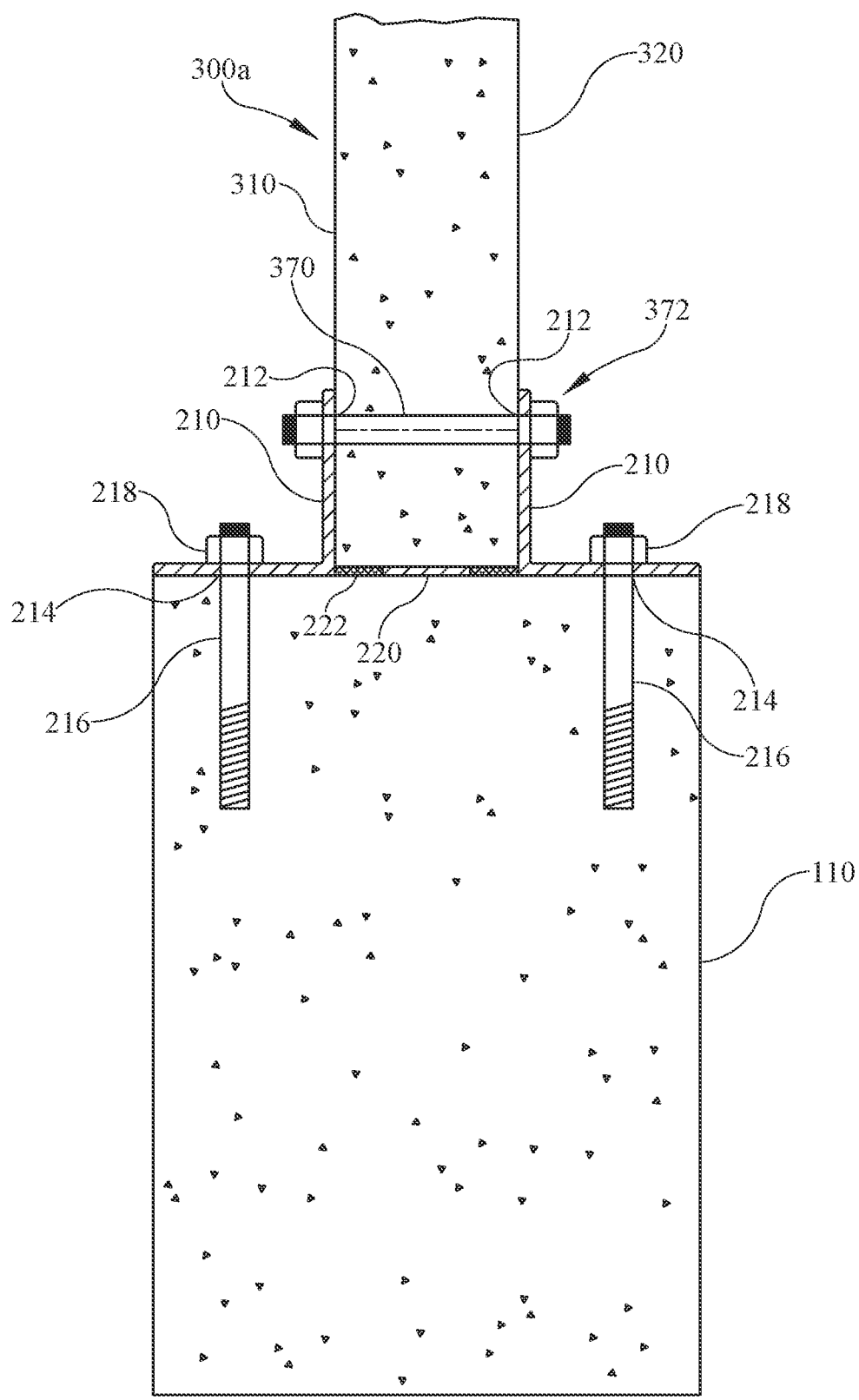
FIG. 2 is a side sectional view of an exemplary connection between the foundation and the shaft of an elevated tank made in accordance with one embodiment of the present invention.

As previously mentioned, the shaft 120 is operably connected to the foundation 110. Specifically, after the foundation 110 is placed on-site, and the segments 300 of the shaft 120 are precast (either on-site of off-site) each segment 300 is sequentially stacked and connected, as discussed below. With reference to FIG. 2, in some exemplary embodiments, the lowermost segment 300*a* is connected to the foundation 110 by angle plates 210, for example 8"×8" angle plates. Specifically, as shown in FIG. 2, the foundation 110 defines a plurality of bolt holes 216 with an anchor bolt 218 extending through a horizontal bolt hole 214 in the angle plate 210 and into a respective bolt hole 216 of the foundation 110.

Likewise, the lowermost segment 300*a* defines a bolt hole 370 with an anchor bolt 372 extending through a vertical bolt hole 212 in the angle plates 210 and through the bolt hole 370. The specific connection used is not limited. For example, the bolts could be set bolt type, drilled and set in place, epoxy set, or cast-in anchor bolts with any necessary modifications readily understood by one skilled in the art in view of the above description.

In the exemplary embodiment shown in FIG. 2, an angle plate 210 is positioned on both the exterior surface 310 and the interior surface 320 of the lowermost segment 300*a* with a single anchor bolt 372 extending through the width of the segment 300*a*. However, in other embodiments, separate bolt holes and anchor bolts could be used on both the interior and/or exterior surfaces.

Prior to connecting the lowermost segment 300*a* to the foundation 110, a shim 220 is positioned between the lowermost segment 300*a* and the foundation 110 and non-shrink grout 222 or an epoxy adhesive is provided to form a buttered joint. In some embodiments, a ⅜" joint is formed, but other thicknesses are possible depending on design and construction considerations.

Figure 3:
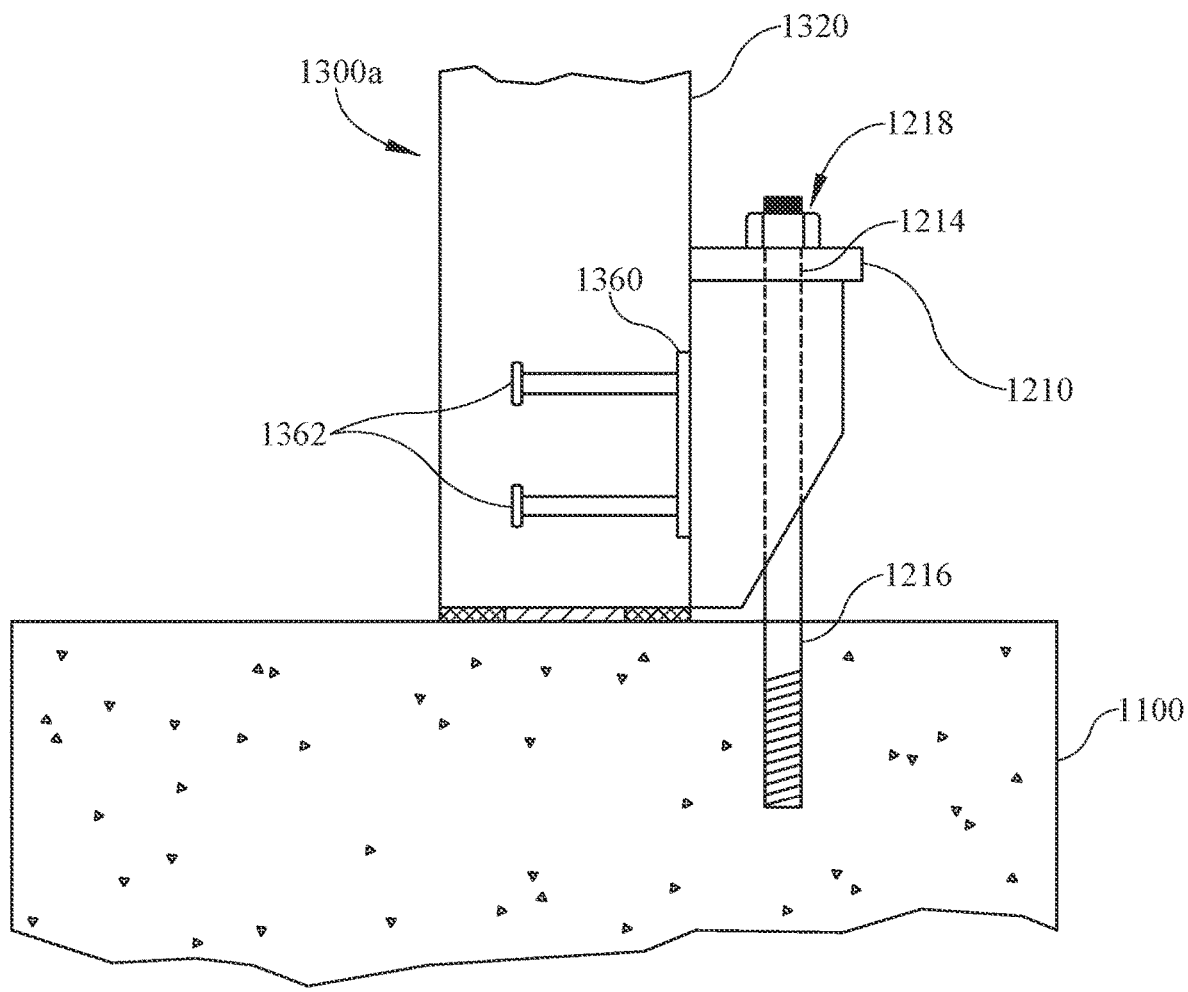
FIG. 3 is a side sectional view of an exemplary connection between the foundation and the shaft of an elevated tank made in accordance with another embodiment of the present invention.

Referring now to FIG. 3, in another exemplary embodiment, a lowermost segment 1300*a* is connected to a foundation 1110 by an anchor chair 1210. Specifically, as shown in FIG. 3, a mounting plate 1360 is embedded in the interior surface 1320 of the lowermost segment 1300*a* utilizing headed concrete anchors 1362 (i.e., a Nelson Stud® which are manufactured by Nelson Stud Welding, Inc.). It is contemplated that the mounting plate 1360 is cast into the lowermost segment 1300*a* during manufacture of the lowermost segment 1300*a*. In some embodiments, the concrete anchors are ½"×5" Nelson Stud®, but different dimensions and quantities can also be used based upon design requirements.

The anchor chair 1210 is then connected to lowermost segment 1300*a* via the embedded mounting plate 1360. Specifically, in this exemplary embodiment, the anchor chair 1210 is welded to the mounting plate 1360, but other connections are possible without departing from the spirit and scope of the present invention. Regardless, the anchor chair 1210 defines a bolt hole 1214 and the foundation 1110 likewise defines a bolt hole 1216. An anchor bolt 1218 extends through the bolt hole 1214 in the anchor chair 1210 and into the bolt hole 1216 of the foundation 1110. More specifically, in the exemplary embodiment shown in FIG. 3, the anchor bolt 1218 is drilled into the foundation 1110 and is set in place with an epoxy. However, other connection means are also possible including, for example, a mechanical anchor which is drilled and set.

Figure 8:
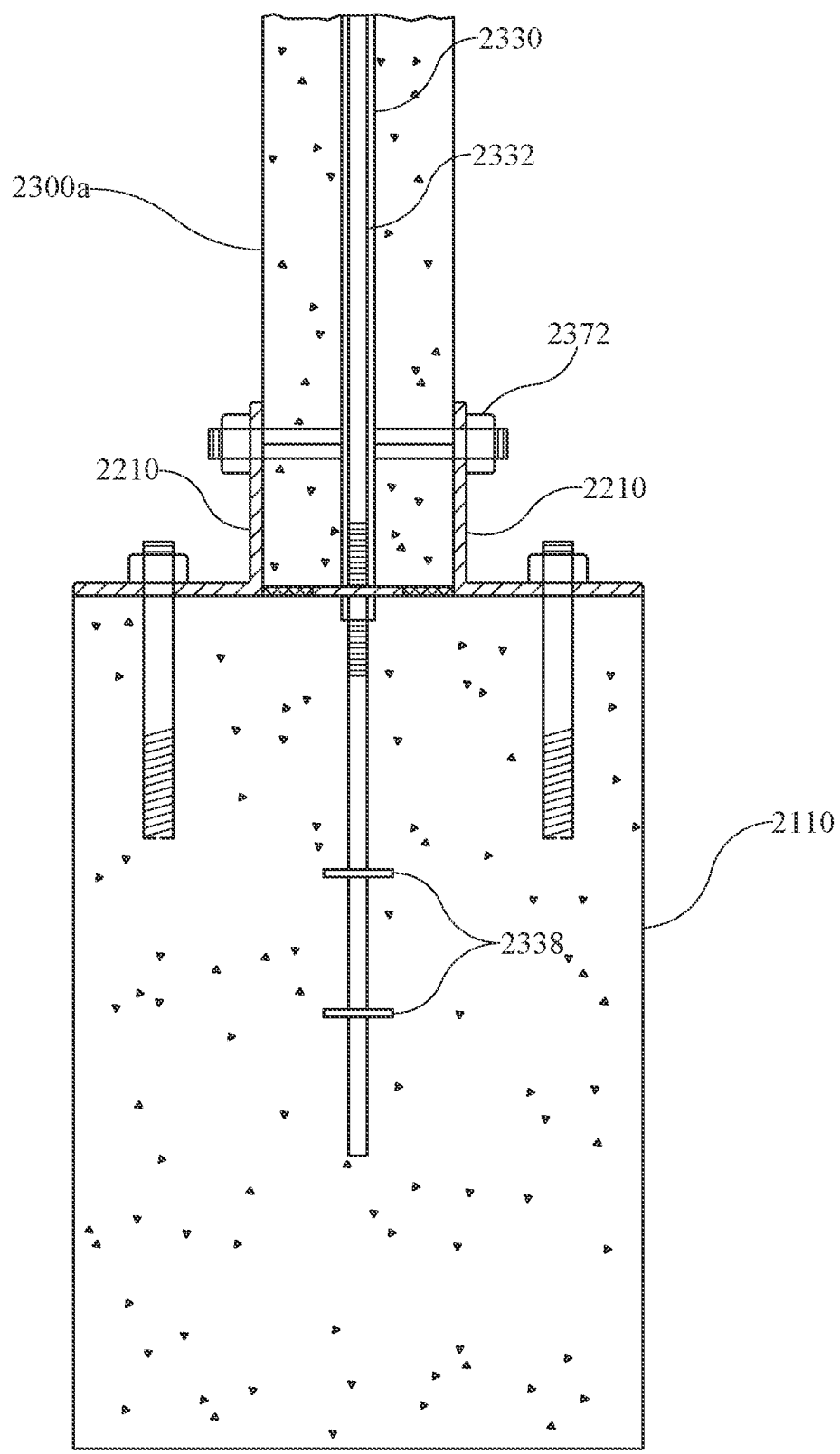
FIG. 8 is a side sectional view of an exemplary connection between the foundation and the shaft of an elevated tank made in accordance with another embodiment of the present invention.

Other means of connecting the shaft to the foundation are also possible including, but not limited to welded connections or the inclusion of tie-rods, as discussed below with reference to FIG. 8. For example, in some embodiments, the lowermost segment is connected to the foundation with a concrete encasement. In such embodiments, rebar is affixed to both the lowermost segment and the foundation to protrude therefrom either by casting the rebar in place or drilling holes and then anchoring the rebar with epoxy. Regardless, additional steel reinforcement in the form of rebar and/or mesh is placed around the protruding rebar to form a steel cage. A form is built around the cage and concrete is poured to encase reinforcing steel and secure the base of the lowermost segment to the foundation.

Figure 4:
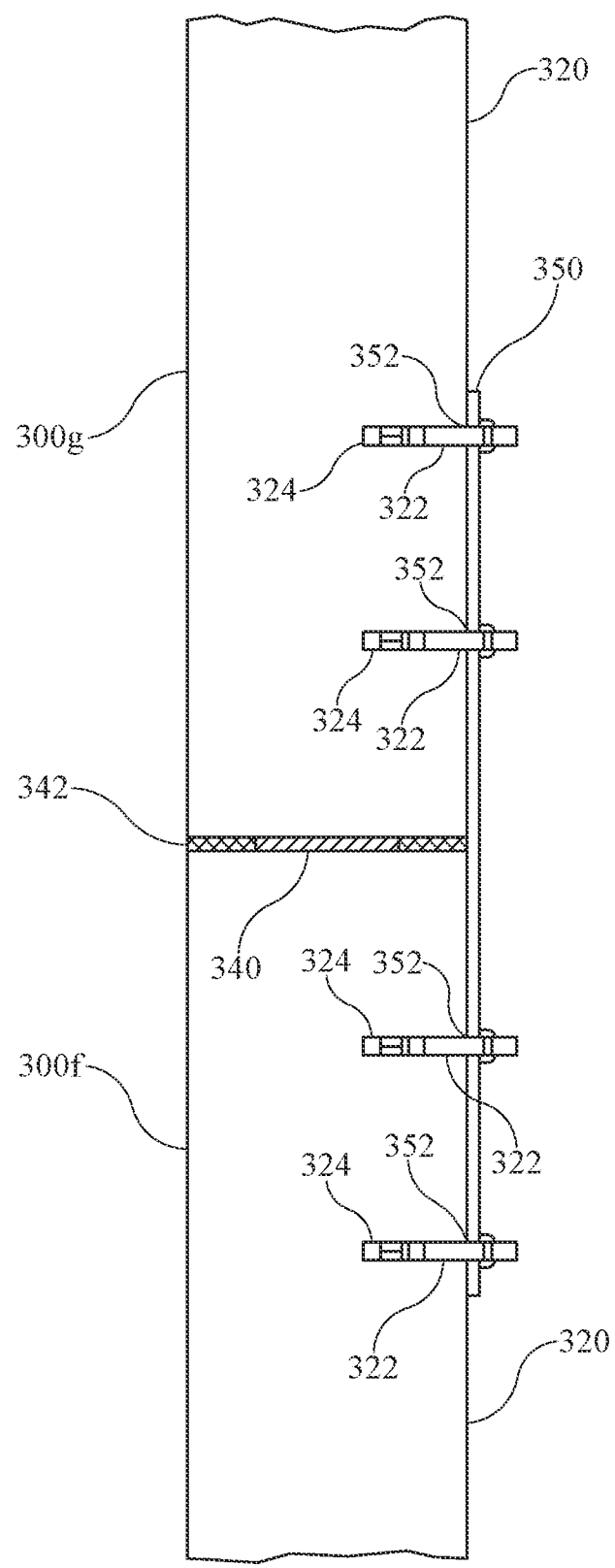
FIG. 4 is a side sectional view of an exemplary connection between two adjacent segments of the shaft of an elevated tank made in accordance with one embodiment of the present invention.

Referring once again to FIG. 1, regardless of the particular connection used between the lowermost segment 300*a* and the foundation 110, each of the subsequent intermediate segments 300*b*-300*k* and uppermost segment 300*l* are then sequentially stacked and connected to each other. Referring now to FIG. 4, which illustrates one exemplary connection between two intermediate segments 300*f*, 300*g*, similar to the connection between the lowermost segment 300*a* and the foundation 110, a shim 340 is positioned between the lower segment 300*f* and the upper segment 300*g* and non-shrink grout 342 or an epoxy adhesive is provided to form a buttered joint.

To connect the segments 300*f*, 300*g*, a spanning plate 350 extends across the joint between the two segments 300*f*, 300*g* adjacent to the interior surfaces 320. Specifically, a plurality of bolt holes 322 are defined by the segments 300f, 300g so as to extend outward from the interior surface 320 of the segments 300f, 300g and bolt anchors 324 are passed through bolt holes 352 defined in the spanning plate 350 and into the bolt holes 322. In some embodiments, the spanning plate 350 is 4"×⅜" and the bolt anchors 324 used are ½"×5" bolt anchors, but different dimensions, different bolts, and/or epoxy anchors, can also be used based upon design requirements.

Figure 5:
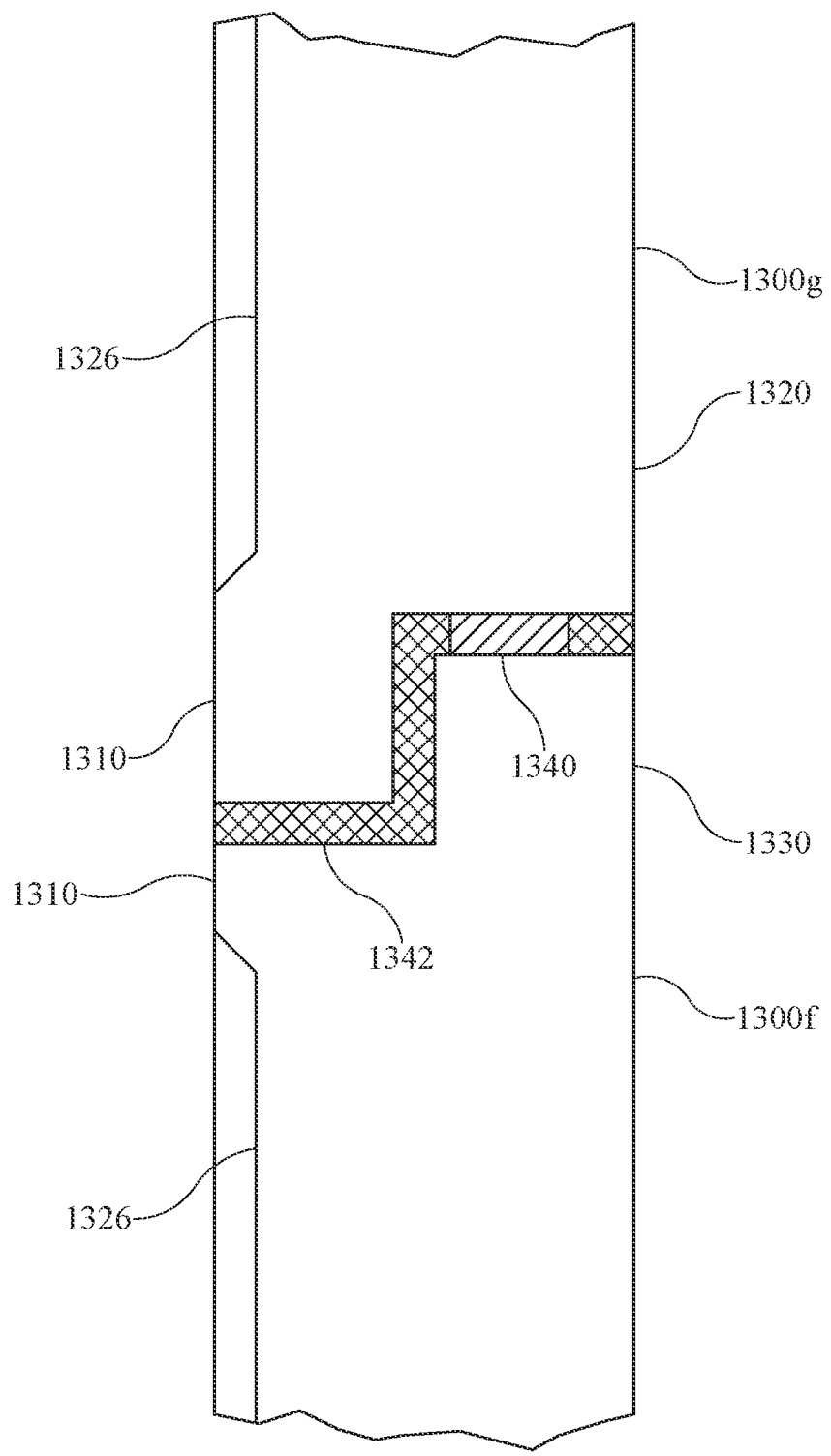
FIG. 5 is a side sectional view of an exemplary connection between two adjacent segments of the shaft of an elevated tank made in accordance with another embodiment of the present invention.

Referring now to FIG. 5, the connection between two intermediate sections needs not rely solely on a horizontal joint. As shown in FIG. 5, a stair step joint can also be utilized. Similar to the connection shown in FIG. 4, a shim 1340 is positioned between the lower segment 1300f and the upper segment 1300g and non-shrink grout 1342 or an epoxy adhesive is provided to form a buttered joint. Although not illustrated, the connection shown in FIG. 5 can also include a spanning plate connecting the two segments 1300f, 1300g along the interior surfaces 1320 of the segments 1300f, 1300g similar to the exemplary connection shown and described with respect to FIG. 4. However, FIG. 5 further illustrates the inclusion of rustications 1326 on the exterior surface 1310 of each of the two segments 1300f, 1300g. Rustication, or other similar additions to the exterior surface (e.g., form liners or colored concrete), can optionally be included on any or all of the segments of the shaft without departing from the spirit and scope of the present invention.

Figures 6, 6A:
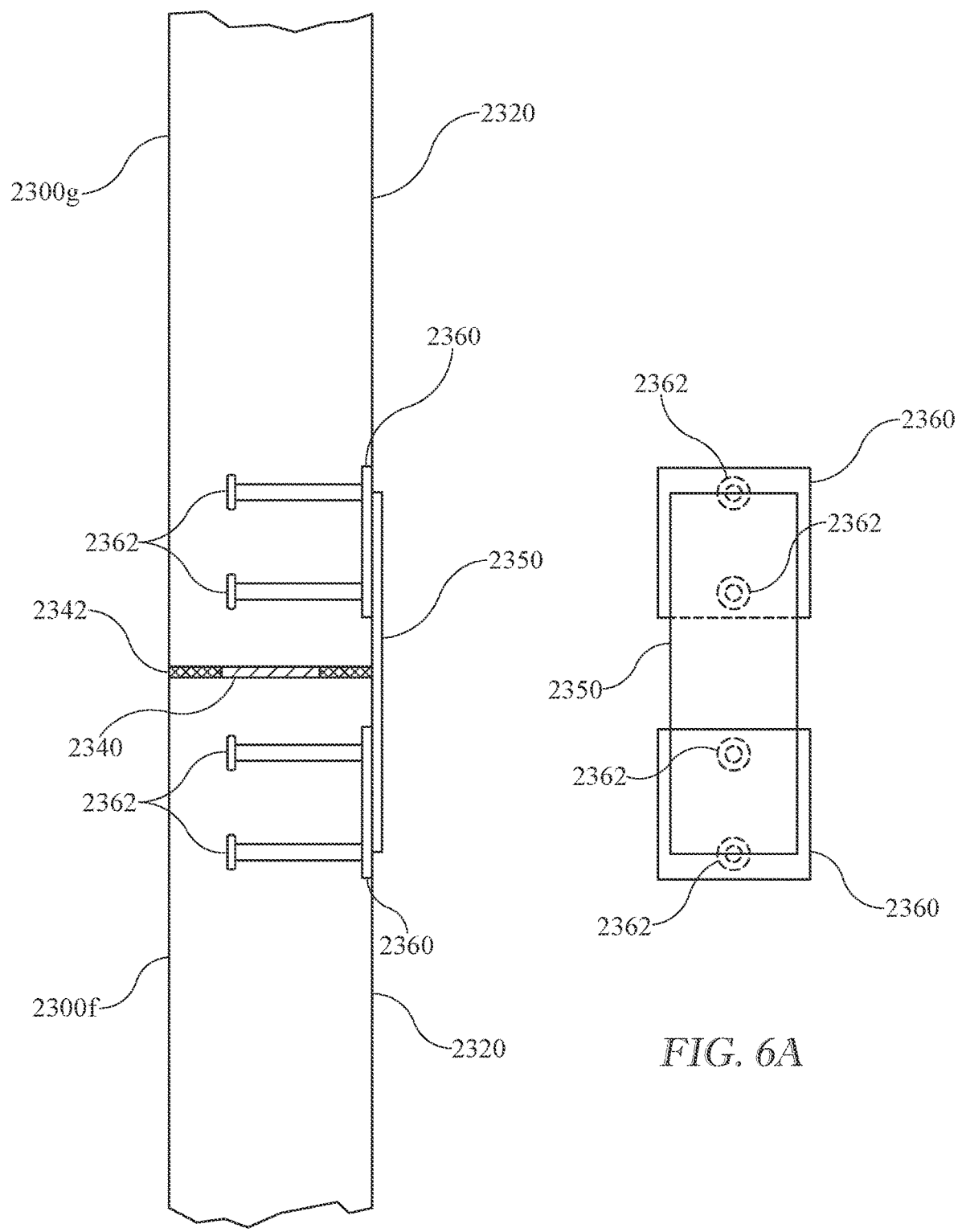
FIG. 6 is a side sectional view of an exemplary connection between two adjacent segments of the shaft made in accordance with another embodiment of the present invention.
FIG. 6A is a schematic view illustrating the spatial relationship between the spanning plate and mounting plates of FIG. 6.

Referring now to FIGS. 6 and 6A, in another exemplary connection between two intermediate segments 2300f, 2300g, rather than bolting the spanning plate 2350 to the two segments 2300f, 2300g, mounting plates 2360 utilizing headed concrete anchors 2362 (i.e., a Nelson Stud©) are cast into the segments 2300f, 2300g during manufacture of the segments 2300f, 2300g. In some embodiments, the spanning plate 2350 is a 5"×1'-2⅜"×⅜" plate, the mounting plates 2360 are 6"×6"×⅜" plates, and the concrete anchors are ½"×5" Nelson Stud®, but different dimensions and quantities can also be used based upon design requirements. The spanning plate 2350 is then welded to each of the mounting plates 2360. As shown in FIG. 6, the mounting plates 2360 are positioned so as to be substantially flush with the interior surface 2320 of the segments 2300f, 2300g. In the embodiment shown in FIG. 6, a shim 2340 and non-shrink grout 2342 or epoxy adhesive are still positioned between the two segments 2300f, 2300g.

Rather than utilizing a spanning plate as shown in the embodiments illustrated in FIGS. 4, 6, and 6A, other spanning structures could be implemented including different cross-sectional shapes such a T-shape or a C-shape. The particular means of affixing such spanning structures would be readily understood by a person of ordinary skill in the art in view of the above disclosure regarding the spanning plate.

Furthermore, although the connections shown in FIGS. 4, 6, and 6A are located on the interior surfaces 320 of the relevant segments, in some other embodiments, connections can be on the exterior surfaces of the segments instead of, or in addition to, the connections on the interior surface.

Figure 7:
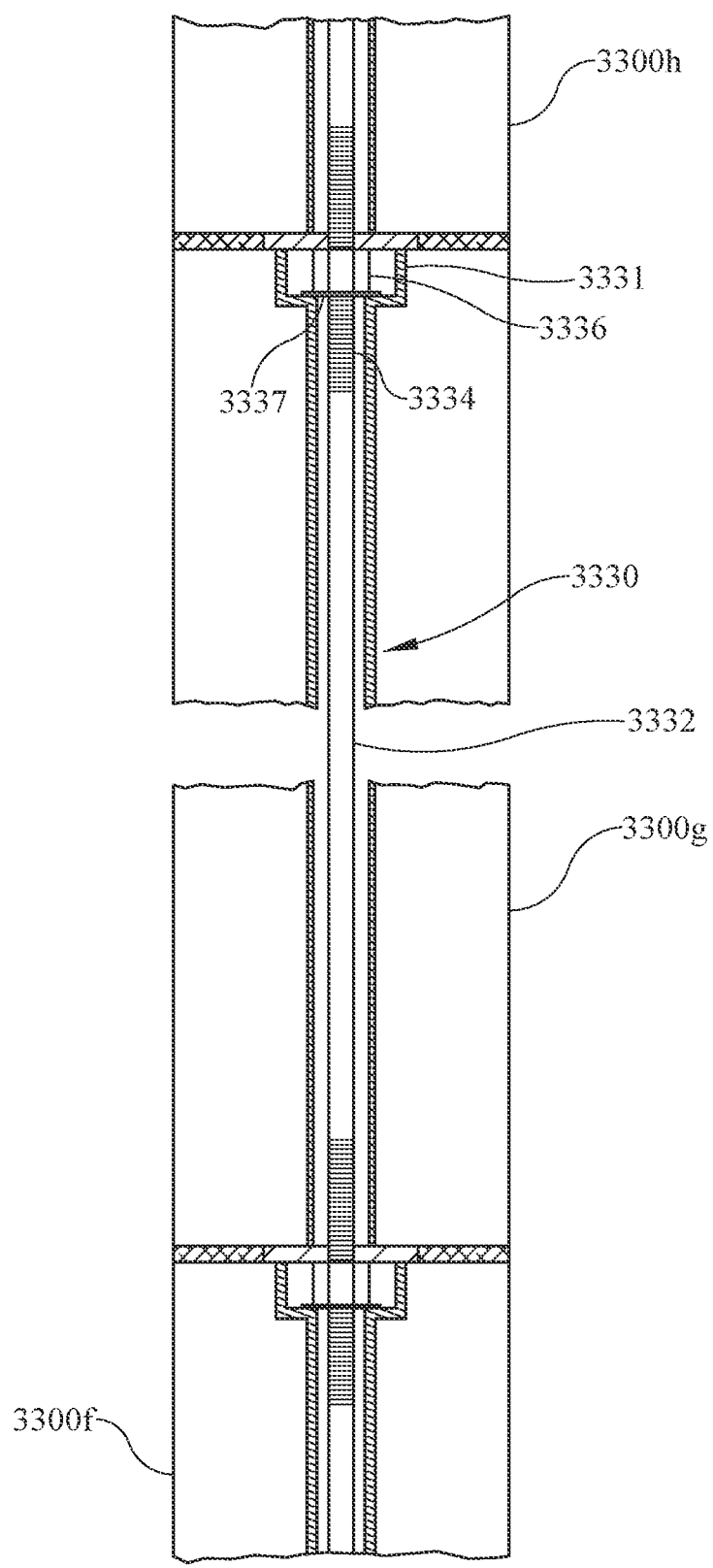
FIG. 7 is a side sectional view of an exemplary connection between three adjacent segments of the shaft made in accordance with another embodiment of the present invention.

Further still, in some exemplary embodiments, an internal spanning member is included which extends through the stacked segments to thereby increase the vertical strength the shaft 120. Referring now to FIG. 7, which illustrates one segment 3300g positioned between two adjacent segments 3300f, 3300h, in one exemplary embodiment, a vertical through hole 3330 is defined through the height of the segment 3300g which a tie-rod 3332 extends through. For example, a PVC pipe can be cast into the segment 3300g during manufacturing to thereby form the through hole 3330. As shown in FIG. 7, the through hole 3330 includes an enlarged end 3331 at the upper end of the segment 3300g. A coupler nut 3336 is positioned within the enlarged end 3331 of the through hole 3330 and onto the threaded ends 3334 of the tie-rod and tightened to provide pre-tensioning of the segment 3300g. To this end, a washer 3337 is also positioned within the enlarged end 3331 of the through hole 3330 such that, as the coupler nut 3336 is tightened, it pushes down onto the washer 3337. In some exemplary embodiments, a 1¼" PVC pipe is used to house a ¾" tie rod with a 3" PVC pipe to house ¾" coupler nuts, but different dimensions can also be used based upon design requirements. Although not expressly described, as shown in FIG. 7, similar structures are present at the upper end of the lower segment 3300f as those found at the upper end of the middle segment 3300g described above.

Of note, it is contemplated that the connections illustrated in FIG. 7 can be used in combination with the connections illustrated in FIGS. 4, 5, and 6. That is to say, in some embodiments, a spanning plate connects the exterior of two adjacent sections and also a tie rod is included which extends through and connects the two adjacent sections. Likewise, other internal spanning members can be used instead of a tie-rod such as a NMB Splice Sleeve® system (manufactured by Splice Sleeve North America, Inc.), or a SLEEVE-LOCK® connection (manufactured by Dayton Superior Corporation) with any necessary modifications readily understood by one skill in the art in view of the above description.

As previously mentioned, tie-rods can also be used in the connection between the lowermost segment and the foundation. Referring now to FIG. 8, the lowermost segment 2300a is still connected to the foundation 2110 with two angle plate 2210 similar to FIG. 2, but a tie-rod 2332 also extends through a vertical through hole 2330 is defined through the height of the segment lowermost segment 2300a and into the foundation 2110. Specifically, in this exemplary embodiment, the tie-rod 2332 is cast into the foundation 2100 with lateral reinforcements 2338 used to secure the tie-rod 2332 in place. However, in other embodiments, tie-rods can be post-installed with an epoxy or grout by means readily understood to one skilled in the art. Likewise, a NMB Splice Sleeve® system, or a SLEEVE-LOCK® connection can be used with any necessary modifications readily understood by one skill in the art in view of the above description. Regardless of the specific installation method, it is contemplated that the inclusion of such tie-rods can be of particular use in situations in which heavier loading is anticipated, such as seismic or high wind locations. According to some exemplary embodiments, the connections shown in FIG. 8 are used in combination with the connections shown in FIG. 2 and/or FIG. 3.

Figure 9:
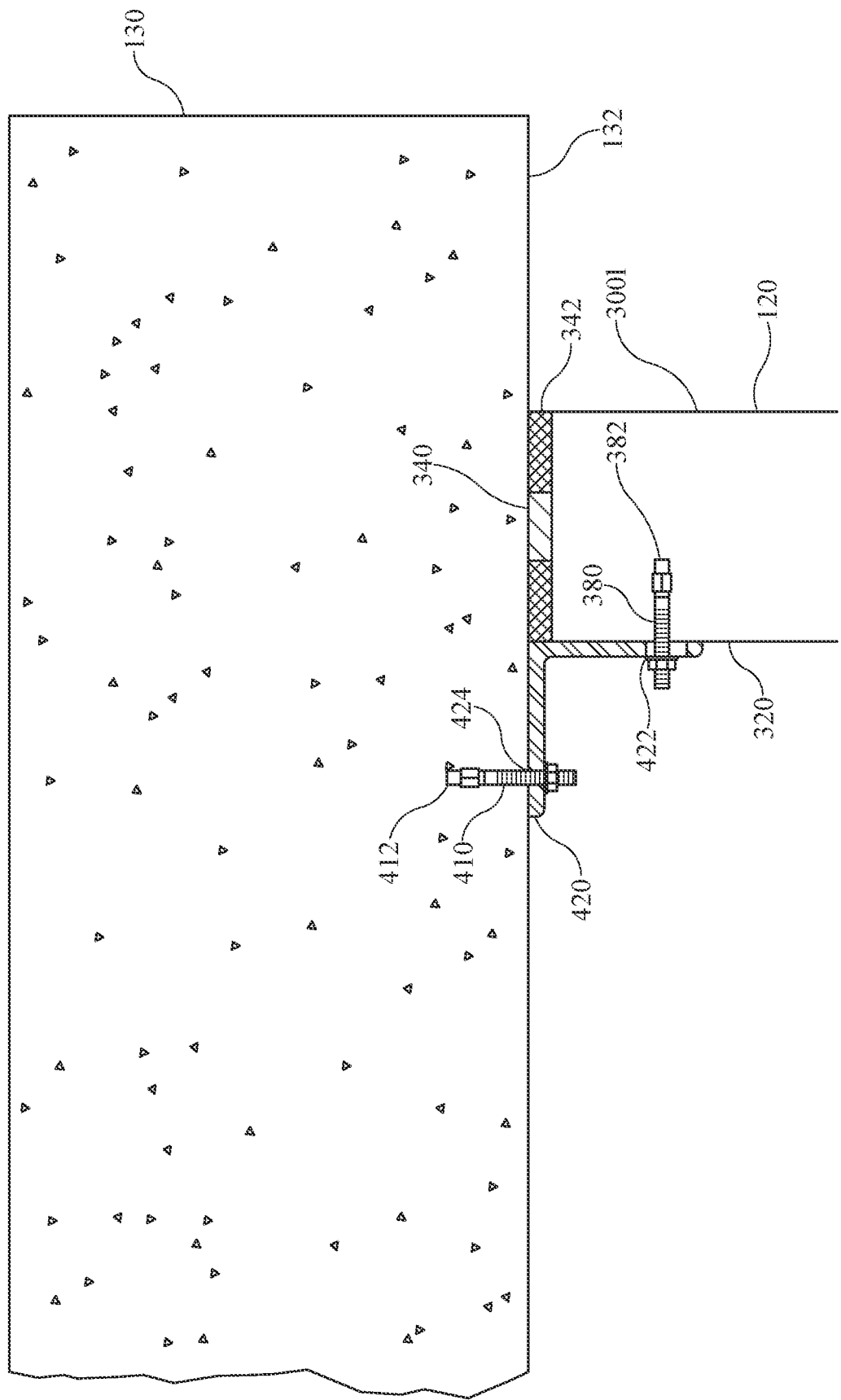
FIG. 9 is a side sectional view of an exemplary connection between the shaft and the superstructure of the elevated tank tower made in accordance with one embodiment of the present invention.

Referring once again to FIG. 1, as previously mentioned, the shaft 120 is also operably connected to the superstructure 130. Referring now to FIG. 9, similar to other connections described above, a shim 340 is positioned between the uppermost segment 300l and the superstructure 130 and non-shrink grout 342 or an epoxy adhesive is provided to form a buttered joint. The uppermost segment 300l is then connected to the superstructure 130 by an angle plate 420. Specifically, as shown in FIG. 9, the superstructure 130 defines a bolt hole 410 in the lower surface 132 of the superstructure 130. A bolt anchor 412 extends through a horizontal bolt hole 424 in the angle plate 420 and into the bolt hole 410 of the superstructure 130. Likewise, the uppermost segment 300l defines a bolt hole 380 with a bolt anchor 382 extending through a vertical slotted hole 422 in the angle plate 420 and into the bolt hole 380. In some exemplary embodiments, the angle plate is a 6"×6"×⅜" angle plate with a ⅝" horizontal hole and a ⅝"×1" vertical slotted hole, but different dimensions can also be used based upon design requirements. Once again, the specific connection used is not limited, and the bolts could be set bolt type, drilled and set in place, epoxy set, or cast-in anchor bolts with any necessary modifications readily understood by one skill in the art in view of the above description.

In the exemplary embodiment shown in FIG. 9, the angle plate 420 is positioned only on the interior surface 320 of the uppermost segment 300*l*. In other embodiments, an angle plate can be positioned on the exterior surface in addition to or instead of the angle plate 420 shown in FIG. 9. Other means of connecting the shaft 120 to the superstructure 130 are also possible including, but not limited to welded connections.

Figure 10:
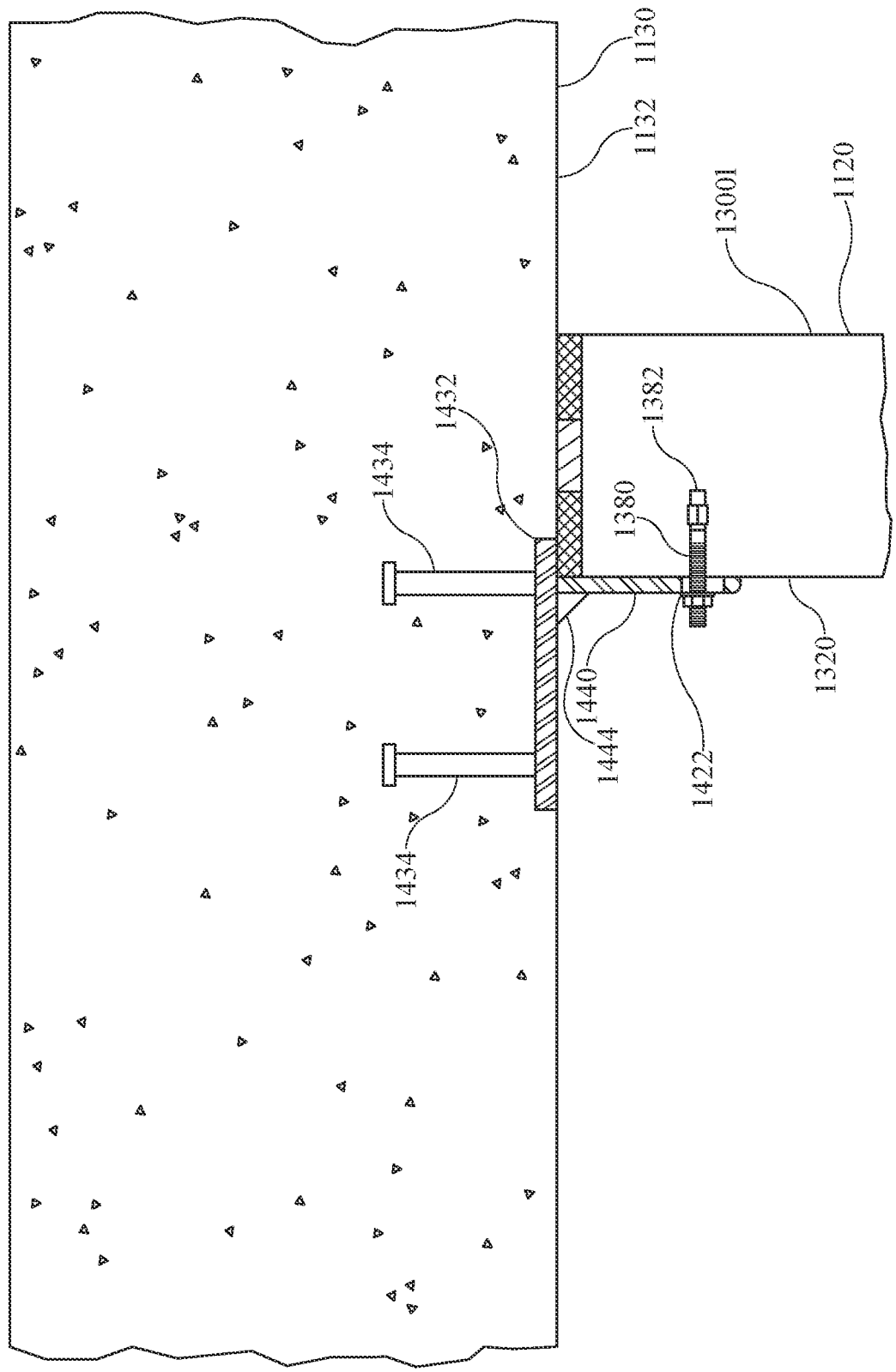
FIG. 10 is a side sectional view of an exemplary connection between the shaft and the superstructure of the elevated tank tower made in accordance with another embodiment of the present invention.

For example, and referring now to FIG. 10, in another exemplary connection between a shaft 1120 and a superstructure 1130, rather than using an angle plate, a mounting plate 1432 utilizing headed concrete anchors 1434 (i.e., a Nelson Stud©) is cast into the lower surface 1132 of the superstructure 1130 so as to be substantially flush with the lower surface 1132 of the superstructure 1130. A plate 1440 is also bolted to the uppermost segment 1300*l* with a bolt anchor 1382 extending through a vertical slotted hole 1442 in the plate 1440 and into a bolt hole 1380, similar to FIG. 9. A weld 1444 is then created to connect the plate 1440 to the mounting plate 1432 in the superstructure 1130 thereby connecting the shaft 1120 and the superstructure 1130.

Figure 11:
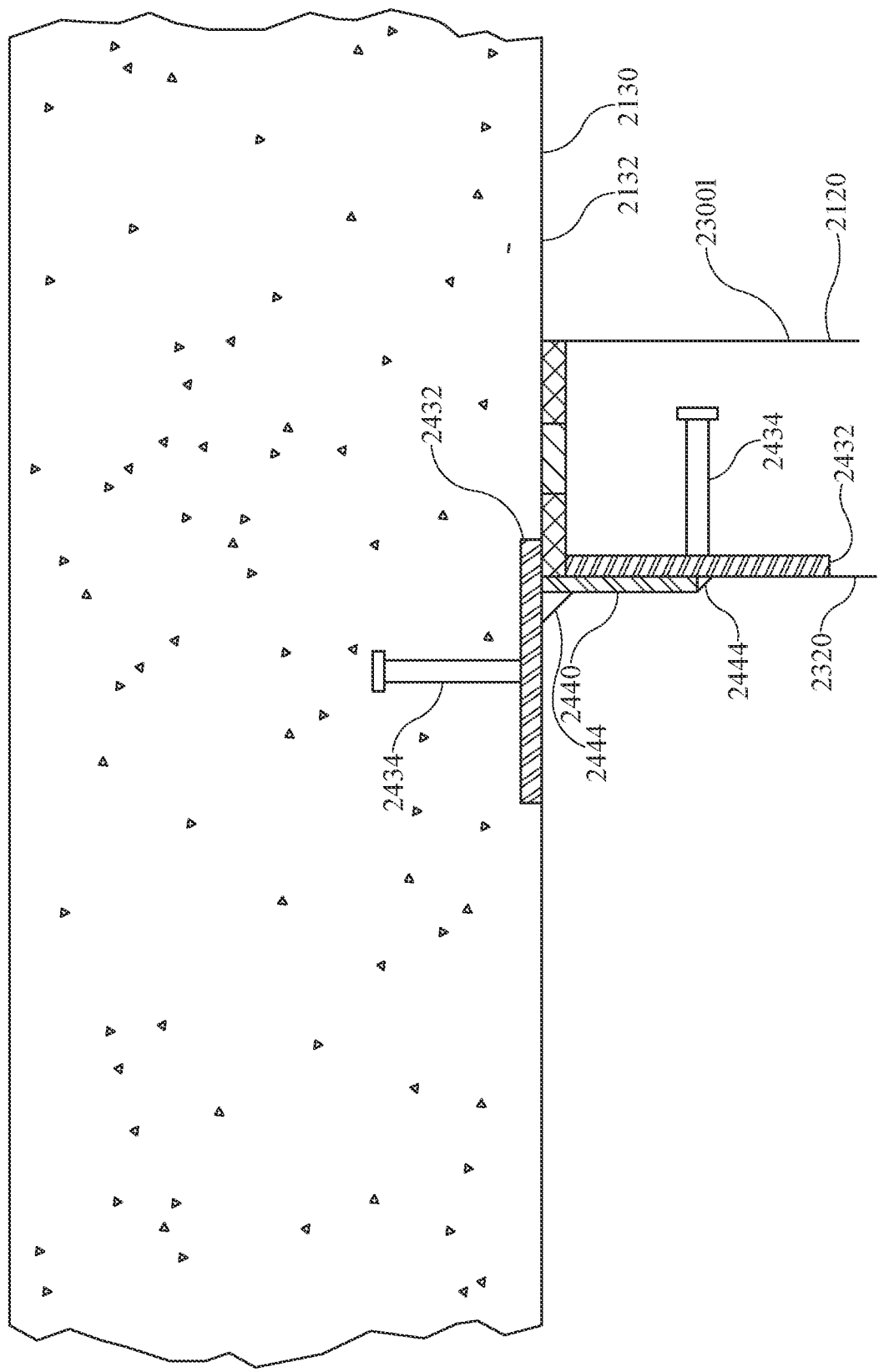
FIG. 11 is a side sectional view of an exemplary connection between the shaft and the superstructure of the elevated tank tower made in accordance with another embodiment of the present invention.

Furthermore, and referring now to FIG. 11, in another exemplary connection between a shaft 2120 and the superstructure 2130, two mounting plates 2432 utilizing headed concrete anchors 2434 (i.e., a Nelson Stud®) are utilized with one mounting plate 2432 cast into the lower surface 2132 of the superstructure 2130 so as to be substantially flush with the lower surface 2132 of the superstructure 2130 and another mounting plate 2432 cast into the interior surface 2320 of the uppermost segment 2300*l* so as to be substantially flush with the interior surface 2320 of the uppermost segment 2300*l*. Welds 2444 are then created to connect a plate 2440 to each of the mounting plates 2432 thereby connecting the shaft 2120 and the superstructure 2130.

Figure 12:
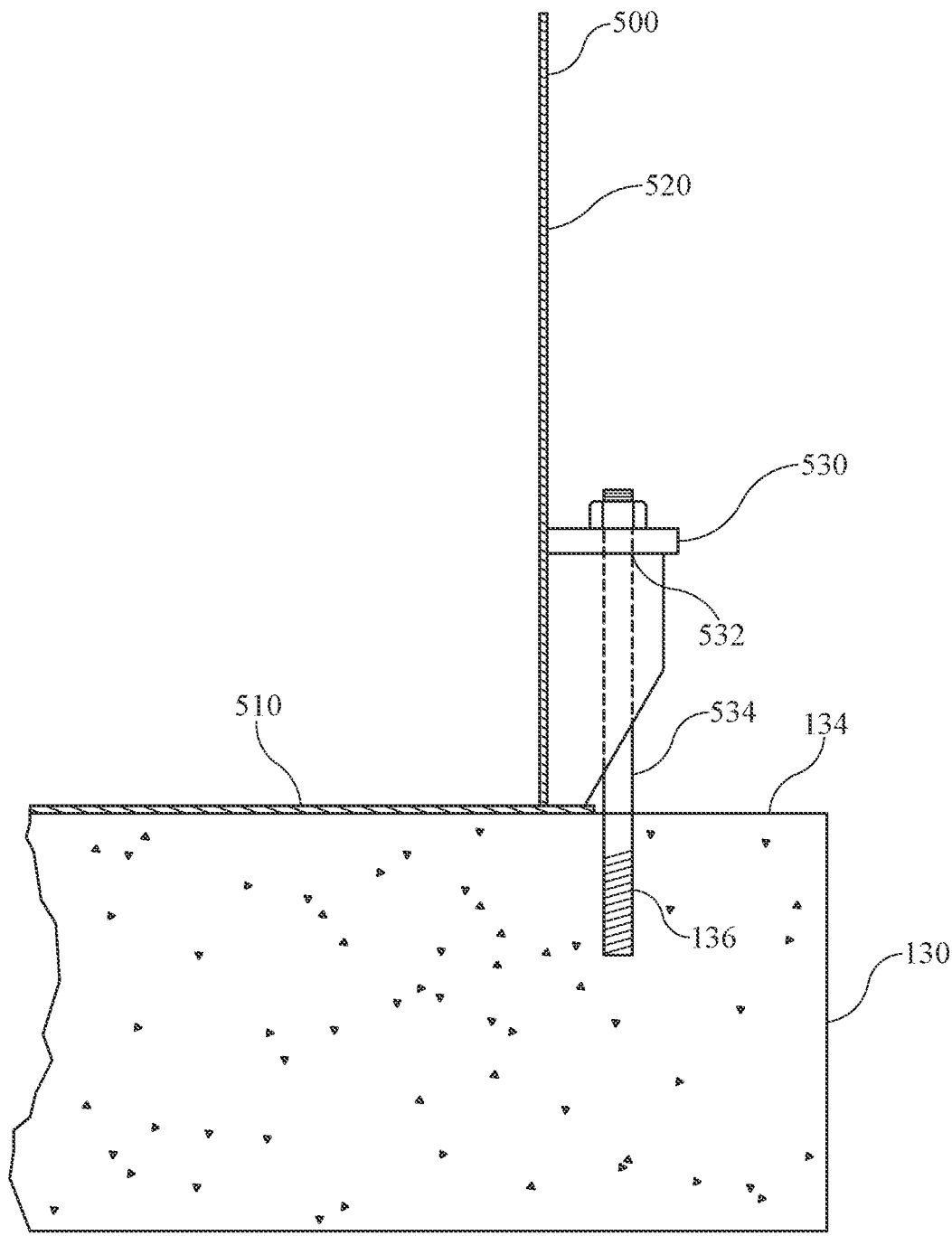
FIG. 12 is a side sectional view of the connection between the superstructure and the steel tank of FIG. 1 made in accordance with one embodiment of the present invention.

Referring once again to FIG. 1, but now also to FIG. 12, the welded steel tank 500 is connected to the upper surface 134 of the superstructure 130. Specifically, in this embodiment, the welded steel tank 500 includes a floor plate 510 and a tank shell 520. An anchor chair 530 is connected to the tank shell 520, for example via welds, and the anchor chair 530 defines a bolt hole 532. In order to connect the welded steel tank 500 to the superstructure 130, the superstructure 130 defines a bolt hole 136 in the upper surface 134 of the superstructure 130 and a tank anchor bolt 534 extends through the bolt hole 532 of the anchor chair 530 and into the bolt hole 136 of the superstructure 130. More specifically, in the exemplary embodiment shown in FIG. 8, the anchor bolt 534 is drilled into the superstructure 130 and is set in place with an epoxy. Once again, the specific connection used is not limited, and the bolts could be set bolt type, drilled and set in place, epoxy set, or cast-in anchor bolts with any necessary modifications readily understood by one skilled in the art in view of the above description.

Figure 13:
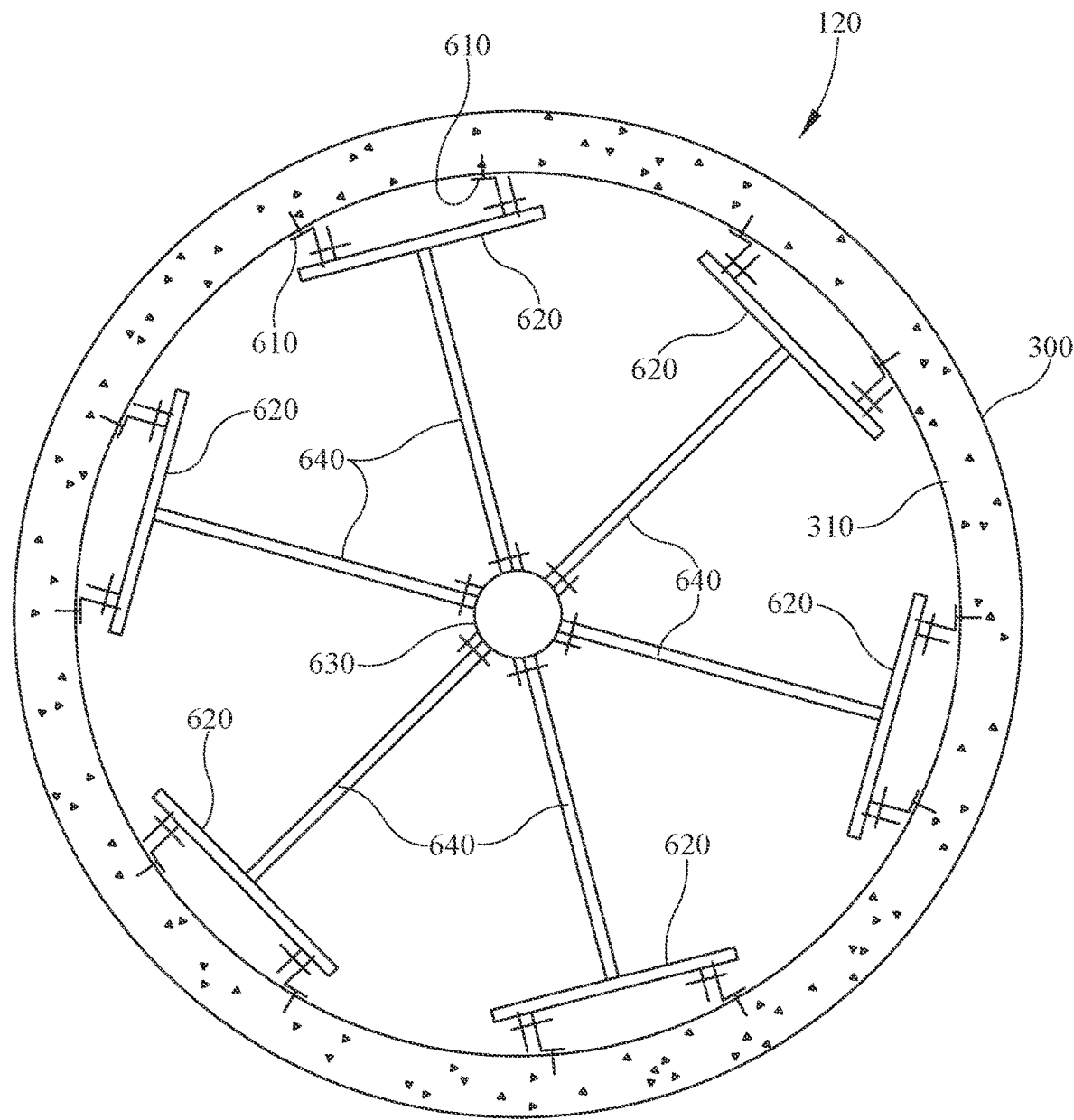
FIG. 13 is a top sectional view of the shaft including an internal support system made in accordance with one embodiment of the present invention.

Referring now to FIG. 13, according to some exemplary embodiments of the present invention, an internal support system is included within the shaft 120 in order to provide additional strength to the shaft 120. FIG. 13 illustrates a cross-sectional view of one of the plurality of segments 300. According to this embodiment, a plurality of vertical members 610 are spaced around the interior surface 310 of the segment 300. The exemplary vertical members 610 are angle plates which are connected to the interior surface 310 of the segment 300 with bolt anchors drilled into the interior surface 310 of the segment 300 although other means of connecting the vertical members 610 (e.g., welded or embedded plates) are possible without departing from the spirit and scope of the present invention. Although not expressly shown, the exemplary vertical members 610 extend vertically up the full height of the shaft 120. However, in other embodiments, similar vertical members may extend only up a partial height of the shaft or there may be multiple vertical members located periodically up the height of the shaft.

In any event, the exemplary internal support system further includes horizontal bracing to connect the plurality of vertical members 610. In particular, peripheral horizontal tubing 620 is used to connect each of two adjacent vertical members 610 near the internal surface 310 of the segment 300. In this exemplary embodiment, the peripheral horizontal tubing 620 is connected to the vertical members 610 with bolts but other connections are possible.

Radial horizontal tubing 640 then connects the peripheral horizontal tubing 620 to a central member 630. In this exemplary embodiment, the radial horizontal tubing 640 is connected to the peripheral horizontal tubing 620 via welds but other connections are possible. In this exemplary embodiment, radial horizontal tubing 640 is connected to the central member 630 with bolts but other connections are again possible.

In the exemplary embodiment, the peripheral horizontal tubing 620, the radial horizontal tubing 640, and the central member 630 are each contained substantially along a horizontal plane. Although not expressly shown, similar structures are then positioned at predetermined distances along the height of the shaft 120. For example, in one exemplary embodiment, the internal support system shown in FIG. 13 is located at each of segments 300*a*-300*l* of the shaft 120 shown in FIG. 1. To this end, some or all of the components of the internal support system can be installed within each segment 300 at the time the segment is constructed and/or prior to the segment being stacked and connected while forming the shaft 120.

The design of the internal support system shown in FIG. 13 is merely exemplary and can be modified by one skilled in the art to address particular design considerations. In all instances, however, such an internal support system includes horizontal members (e.g., the peripheral horizontal tubing 620, the radial horizontal tubing 640, and the central member 630) spanning across an internal space of the shaft and connecting different points of an internal surface of the shaft. For example, more or less vertical members can be provided at a variety of different spacing around the interior surface without departing from the spirit and scope of the present invention. Likewise, in some embodiments, the peripheral horizontal tubing, the radial horizontal tubing, and/or the central member can be modified or excluded altogether.

Figure 14:
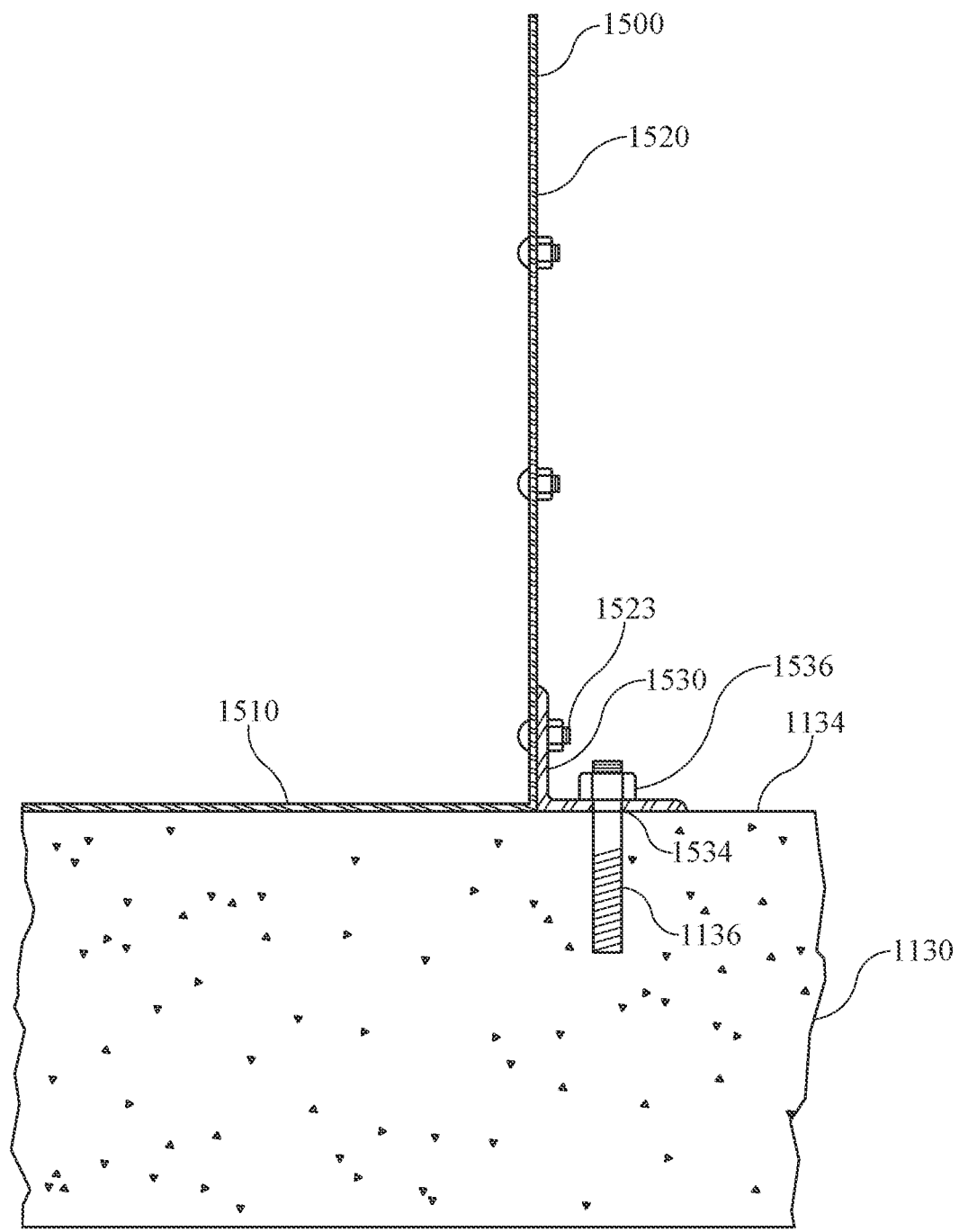
FIG. 14 is a side sectional view of an exemplary connection between the superstructure and a bolted steel tank made in accordance with one embodiment of the present invention.

Referring now to FIG. 14, in another exemplary embodiment of the present invention, the superstructure 1130 is similar to the superstructure discussed above with respect to FIGS. 1 and 9-12. However, in the embodiment shown in FIG. 14, the containment tank is a bolted tank 1500 connected to the superstructure 1130. Specifically, as shown in FIG. 14, in this embodiment, the bolted tank 1500 includes an optional floor plate 1510 and a tank shell 1520. An angle plate 1530 is connected to the tank shell 1520 by a bolt 1523. An anchor bolt 1536 extends through a horizontal bolt hole 1534 in the angle plate 1530, and, similar to the welded steel tank 500, the anchor bolt 1536 is drilled into a bolt hole 1136 in the superstructure 1130 and set in place with an epoxy. However, other connection means are also possible including, for example, a mechanical anchor which is drilled and set.

Figure 15:
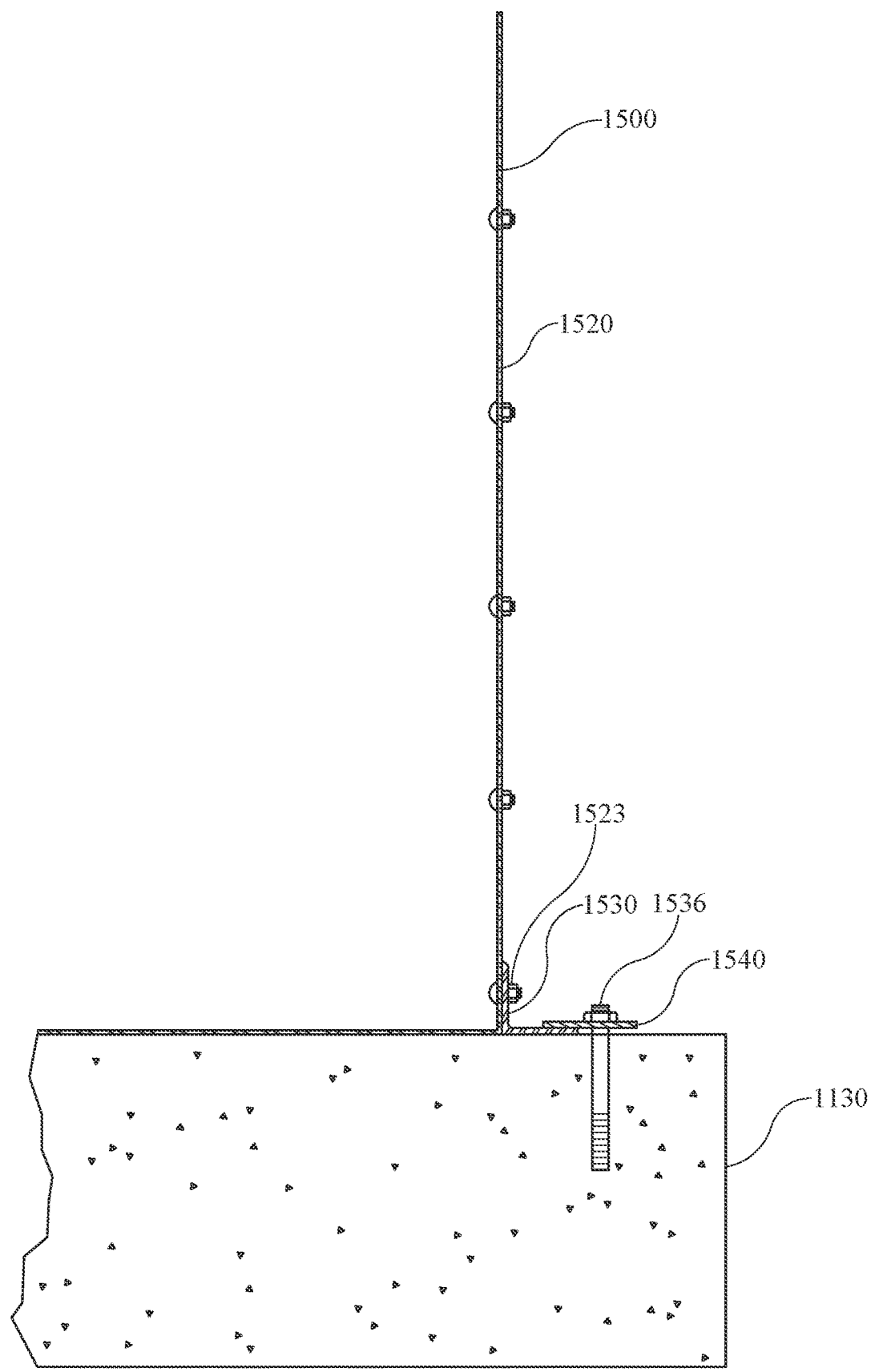
FIG. 15 is a side sectional view of one an exemplary connection between the superstructure and a bolted steel tank made in accordance with another embodiment of the present invention.

Likewise, and referring now to FIG. 15, in another exemplary connection between a bolted tank 1500 and the superstructure 1130, similar to FIG. 14, an angle plate 1530 is connected to the tank shell 1520 by a bolt 1523. A horizontal plate 1540 is then secured to the superstructure 1130 with an anchor bolt 1536. The horizontal plate 1540 is positioned over the angle plate 1530 such that, when the horizontal plate 1540 is bolted down, it secures the angle plate 1530 to the superstructure 1130. The horizontal plate 1540 and the angle plate 1530 can, in some embodiments, also be welded together. Of note, the exemplary connections illustrated in FIG. 14 and FIG. 15 are not only operable with a bolted tank (as shown) but it can also be used with a welded steel tank (e.g., the welded steel tank 500 shown and described with respect to FIGS. 1 and 12). With respect to FIGS. 14 and 15, the bolts could be set bolt type, drilled and set in place, epoxy set, or cast-in anchor bolts with any necessary modifications readily understood by one skill in the art in view of the above description.

Figure 16:
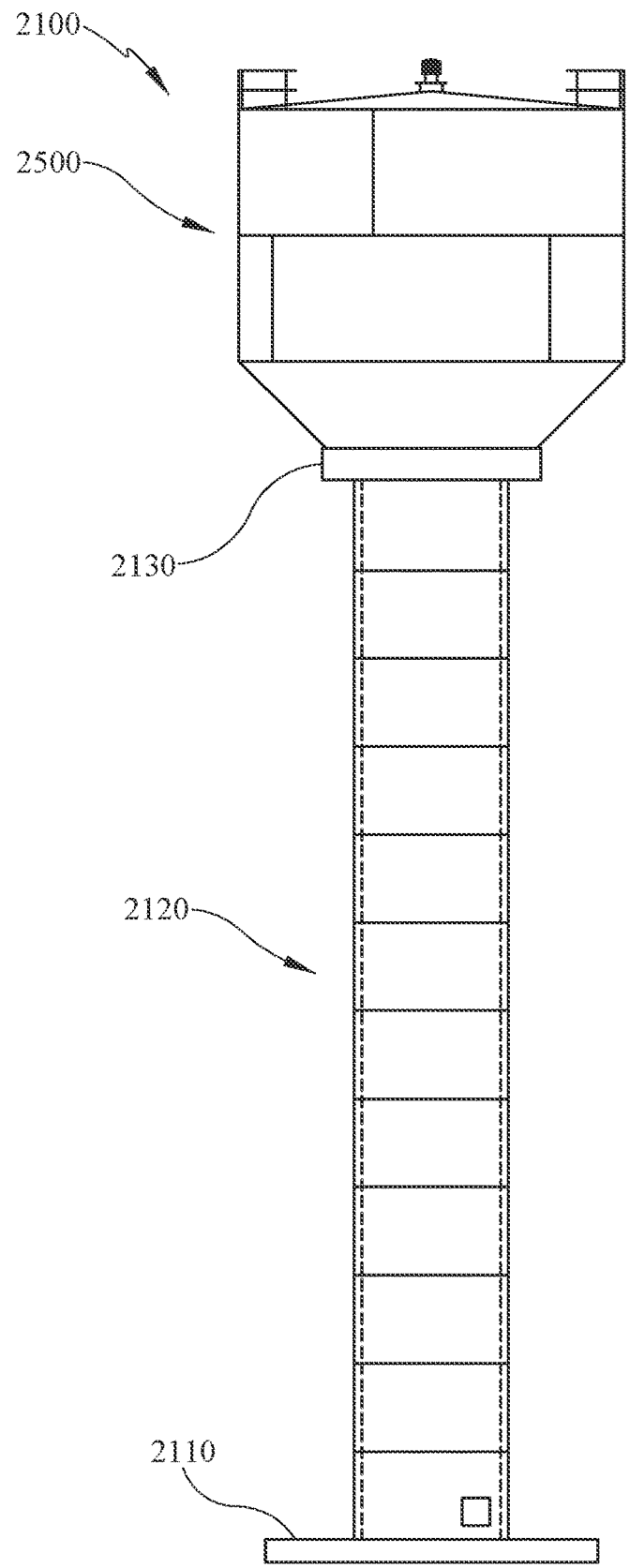
FIG. 16 a side view of an elevated tank tower made in accordance with another embodiment of the present invention in which a conical welded steel tank is included.
Figure 17:
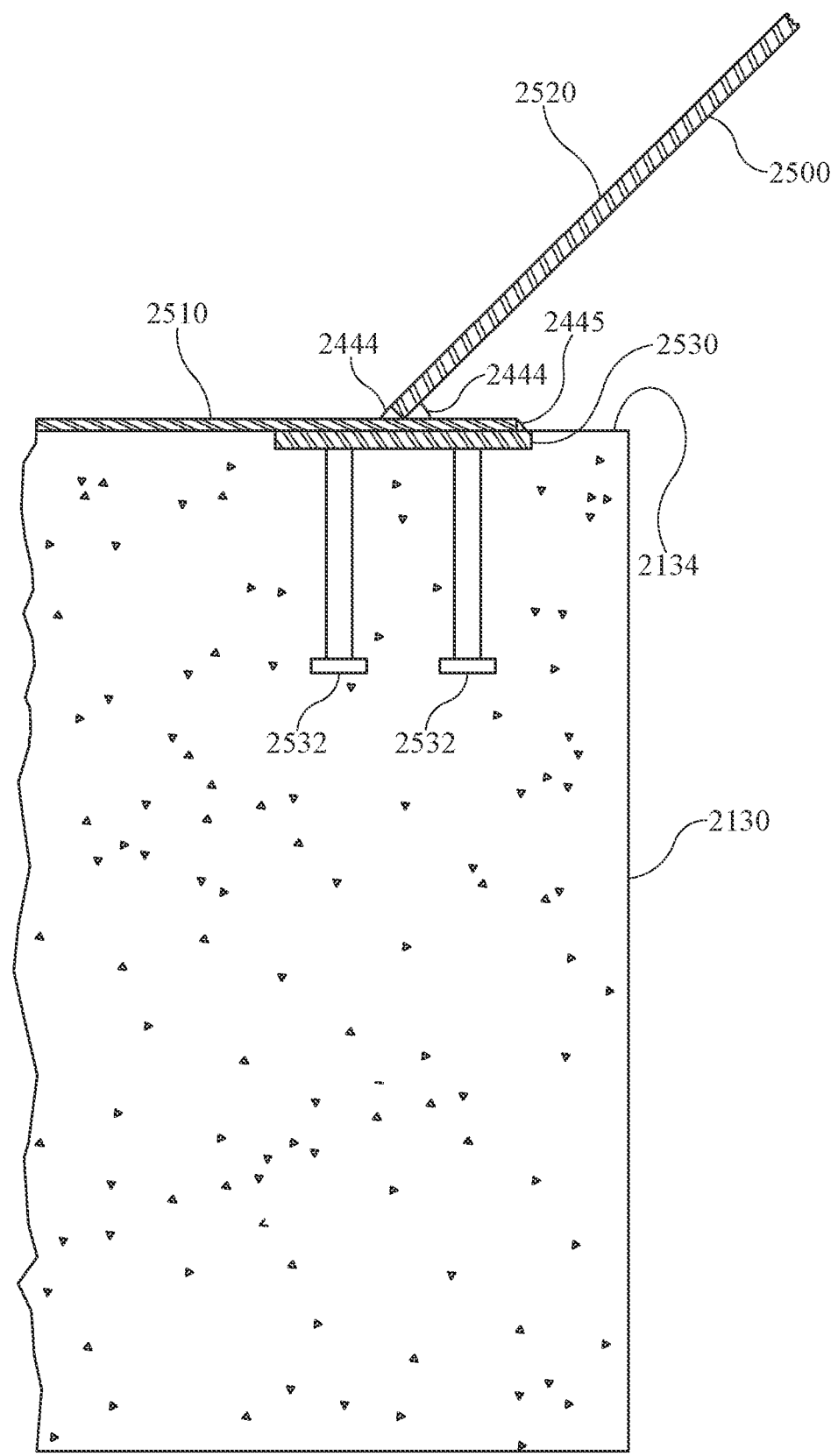
FIG. 17 is a side sectional view of an exemplary connection between the superstructure and the conical welded steel tank of FIG. 16 made in accordance with one embodiment of the present invention.

Referring now to FIG. 16 and FIG. 17, in another exemplary elevated tank tower 2100 made in accordance with the present invention, the foundation 2110, shaft 2120, and superstructure 2130 are similar to the foundation 110, shaft 120, and superstructure 130 discussed above. However, in the embodiment shown in FIG. 16 and FIG. 17, the containment tank is a conical welded steel tank 2500 that is included and connected to the superstructure 2130. Specifically, as shown in FIG. 17 in this embodiment the conical welded steel tank 2500 includes a floor plate 2510 and a container cone 2520 which extends upward from the floor plate 2510 at an angle and is connected to the floor plate 2510 with welds 2444.

As shown in FIG. 17, in order to connect the conical welded steel tank 2500 to the superstructure 2130, a mounting plate 2530 utilizing headed concrete anchors 2532 (i.e., a Nelson Stud®) is cast into the upper surface 2134 of the superstructure 2130 during manufacture of the superstructure 2130. The conical welded steel tank 2500 is then connected to the mounting plate 2530 with welds 2445. In the embodiments shown in FIG. 17, the mounting plates 2530 are positioned so as to be substantially flush with the upper surface 2134 of the superstructure 2130.

Of course, the particular containment tanks 500, 1500, 2500 and means of connection to the superstructure 130, 1130, 2130 are merely exemplary and other tank designs and/or connections are possible without departing from the spirit and scope of the present invention. For example, containment tanks that can be used in accordance with the present invention include, but are not limited to, welded carbon tanks, stainless steel tanks, bolted galvanized tanks, and glass fused tanks. According to some embodiments, commonly sized containment tanks have a capacity of about 60,000 gallons to about 300,000 gallons, however other sizes may be utilized.

Although not expressly shown, it should be understood than the connections shown are reproduced periodically around the perimeter of the relevant portions of the exemplary elevated tank towers of the present invention. For example, four to thirty of such connections can be included either equally spaced or at predetermined positions in accordance to the design requirements for the exemplary elevated tank towers. While in some embodiments the number and types of connections are the same between each of the adjacent segments, in other embodiments, the number of connections and/or the types of connections vary between the segments. However, if the number of connections required are too numerous, the individual connections may instead be in the form of a consistent "ring" rolled to the proper radius.

An elevated tank tower made in accordance with the present invention advantageously simplifies not only the manufacture of the individual sections for the shaft, but overall the construction process is improved. As more of the work is produced at grade, there is a reduction to the exposure workers have to fall hazards and overhead dangers. Furthermore, future maintenance and associated costs are reduced through the use of concrete, stainless steel, and galvanized materials.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A method of manufacturing an elevated tank tower, the method comprising the steps of:
   pouring a concrete foundation;
   casting a plurality of substantially identical ring segments;
   stacking a lowermost segment of the plurality of substantially identical ring segments on the foundation and connecting the lowermost segment to the foundation;
   sequentially stacking one or more intermediate segments of the plurality of substantially identical ring segments on the lowermost segment and connecting each intermediate segment to an adjacent segment until an uppermost segment of the plurality of substantially identical ring segments is stacked to thereby form a substantially cylindrical support structure;
   providing a superstructure which is operably connected to the uppermost segment; and
   providing a containment tank which is connected to an upper surface of the superstructure.

2. The method of claim 1, wherein the segments are connected to the adjacent segment with spanning plates bolted to the segments after the segment is stacked.

3. The method of claim 1, wherein the segments are connected to the adjacent segment with spanning plates welded to mounting plates installed in the segments when the segments are cast.

4. The method of claim 1, wherein before stacking each segment, horizontal members are installed across an internal space of the segment, the horizontal members connecting different points of an internal surface of segment.

5. The method of claim 1, wherein the lowermost segment is bolted to the foundation.

6. The method of claim 1, wherein the lowermost segment is connected to the foundation with one or more angle plates bolted to the lowermost segment and the foundation.

7. The method of claim 1, wherein the lowermost segment is connected to the foundation with one or more mounting plates embedded in the lowermost segment and one or more anchor chairs each welded to one of the one or more mounting plates, each of the one or more anchor chairs bolted to the foundation.

8. The method of claim 1, wherein the containment tank has a capacity of about 60,000 gallons to about 300,000 gallons.

9. The method of claim 1, wherein a diameter of each of the plurality of substantially identical ring segments is about 12 feet to about 16 feet, and wherein a height of each of the plurality of substantially identical ring segments is between about 6 feet and about 8 feet.

* * * * *